BATHTUB COMBINATION PLUMBING FIXTURE

Original Filed Nov. 24, 1967 3 Sheets-Sheet 1

INVENTORS.
PAUL A. MONGERSON
JOSEPH E. ELLISON
BY Parker & Carter
Attorneys.

BATHTUB COMBINATION PLUMBING FIXTURE

Original Filed Nov. 24, 1967 3 Sheets-Sheet 2

INVENTORS.
PAUL A. MONGERSON
JOSEPH E. ELLISON
BY Parker & Carter
Attorneys.

BATHTUB COMBINATION PLUMBING FIXTURE

Original Filed Nov. 24, 1967 3 Sheets-Sheet 3

INVENTORS.
PAUL A. MONGERSON
JOSEPH E. ELLISON
BY Parker & Carter
Attorneys.

United States Patent Office

Re. 27,655
Reissued June 5, 1973

27,655

BATHTUB COMBINATION PLUMBING FIXTURE

Paul A. Mongerson, Elyria, and Joseph E. Ellison, Amherst, Ohio, assignors to Stanadyne, Inc., Hartford, Conn.

Original No. 3,443,266, dated May 13, 1969, Ser. No. 685,375, Nov. 24, 1967. Application for reissue May 8, 1970, Ser. No. 35,948

Int. Cl. E03c *1/00;* F16l *5/00*

U.S. Cl. 4—191 17 Claims

Matter enclosed in heavy brackets [ ] appears in the original patent but forms no part of this reissue specification; matter printed in italics indicates the additions made by reissue.

ABSTRACT OF THE DISCLOSURE

This invention relates to a plumbing fixture and means for mounting it. In particular the invention relates to a bathtub combination plumbing fixture which may include, as an integral part of the fixture, a grab bar or hand grip, a mixing valve and a control member therefor, a soap dish, a spout for water discharge into the tub, and a diverter for controlling water flow to the spout or shower. The mounting for the plumbing fixture is formed by means of a mounting plate, poisitioned on the opposite side of the wall surface from the utilitarian and decorative portions of the plumbing fixture described above.

This invention relates to a plumbing fixture and means for mounting the same. In particular, the invention relates to a plumbing fixture for use in a bathtub and including not only the conventional tub spout, but also the mixing valve, a diverter for directing water either through the tub spout or up to a shower fixture, a handle for operating the mixing valve, as well as a grab bar conventionally found in a separate portion of the tub, and a soap holding fixture.

The invention is also particularly concerned with the mounting arrangement for such a plumbing fixture, with the mounting arrangement including a plate, spaced on the opposite side of the wall surface from the visible portions of the plumbing fixture and including a mounting for the mixing valve itself. The mounting plate also includes means for attaching it to a supporting beam, for example a conventional two-by-four. The mounting plate includes projections, both extending toward the exterior portions of the plumbing fixture and extending inward, with said projections being used to space and mount the plate.

Another purpose of the invention is a combination plumbing device which combines all of the various plumbing fixtures and appurtenances found in the tube into a single decorative unit.

Another purpose is a plumbing fixture using the bathroom wall for carrying the full load of the fixture.

Another purpose is a plumbing fixture which may be simply installed.

Other purposes will appear in the ensuing specification, drawings and claims.

The invention is illustrated diagrammatically in the following drawings wherein.

Figure 2:
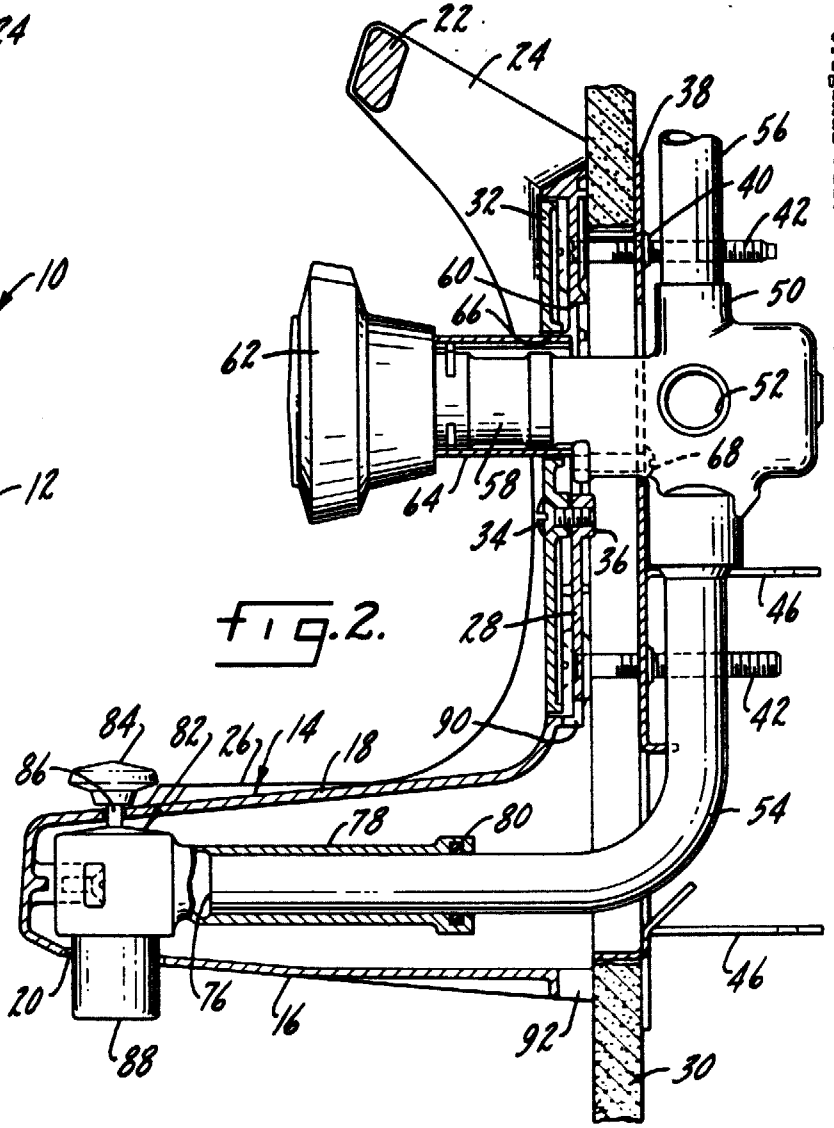
FIGURE 2 is a section along plane 2—2 of FIGURE 1.
Figure 1:
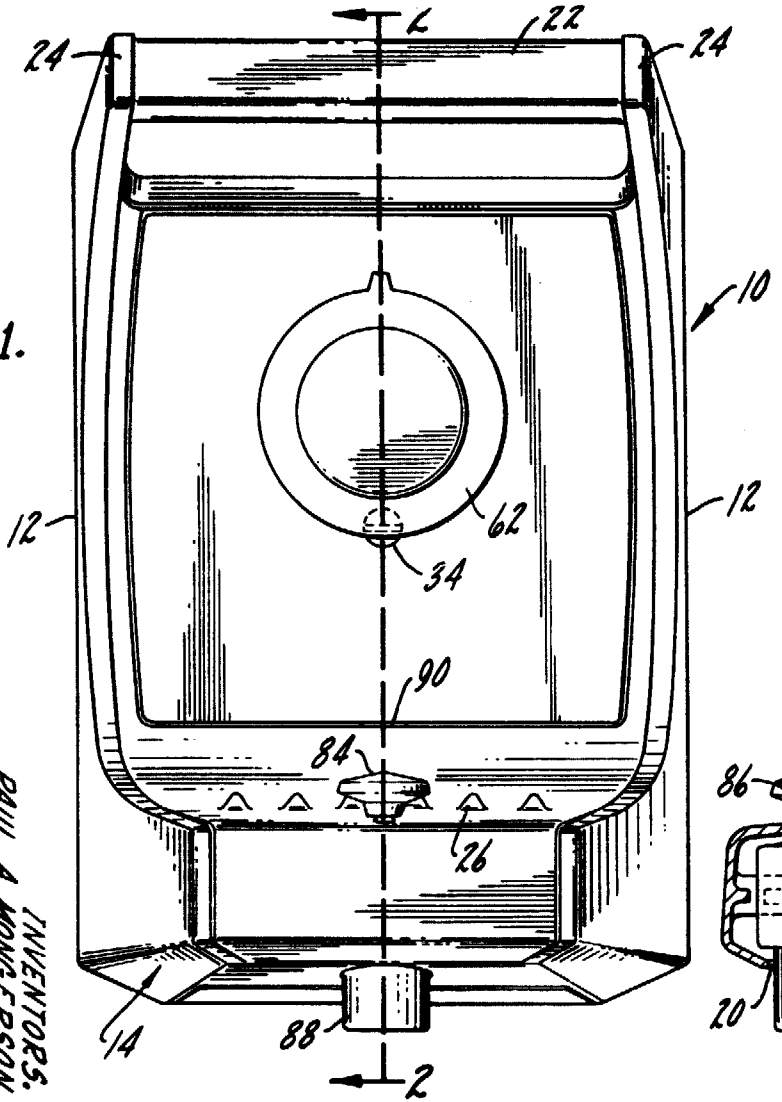
FIGURE 1 is a front plan view of the accessory center disclosed herein.

Turning particularly to FIGURES 1 and 2, a base member, which may for example be a metal casting, is indicated generally at 10 and may include sides 12, spaced apart and each having a rather pronounced and decorative curvature. Near the bottom of the base member 10 the sides tend to converge to form a spout housing( indicated at 14. The spout housing has a bottom 16 and a top surface 18. There is an opening 20 in the bottom surface 16 for a portion of the tub spout to be described hereinafter.

At the top of the frame member 10 is a hand grip or grab bar 22 which is connected between upwardly and outwardly extending portions 24 of the sides 12.

At a lower portion of the plumbing fixture, and formed at the spout portion 14 of the base member 10, are a plurality of spaced and parallel ribs 26, which, as illustrated in FIGURE 2, form a platform which is generally parallel with the floor for providing a soap platform. As shown herein, the ribs 26 are integral with the base member 10, but they could be otherwise.

The base member 10, as illustrated particularly in FIGURE 2, has an inner plate 28, which is integral with the base member and which, in mounting position, is adjacent the wall surface indicated at 30. Outside of the inner plate 28 is a decorative outer plate 32, which may be attached to the inner plate 28 by a screw or the like 34, extending into a threaded boss 36.

Figure 3:
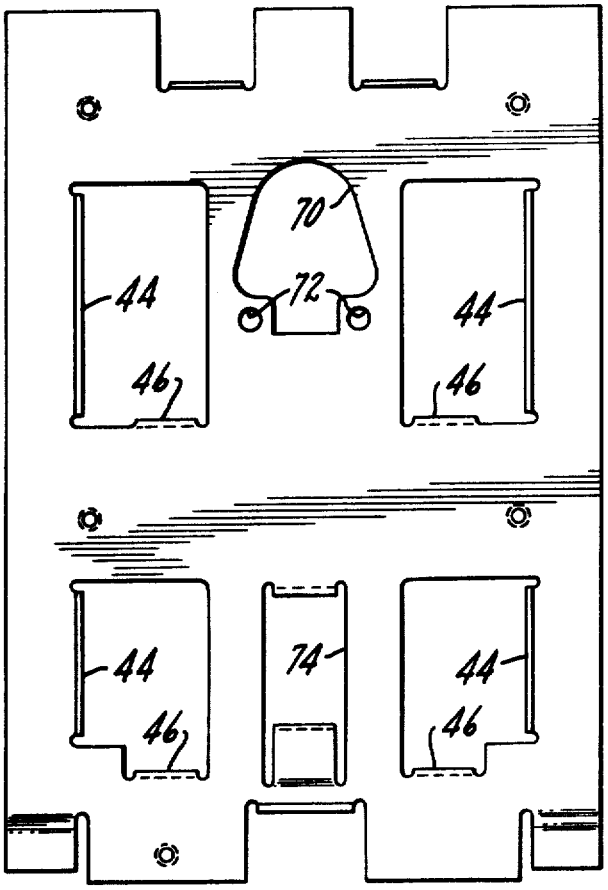
FIGURE 3 is a plan view of the mounting plate used herein.
Figure 4:
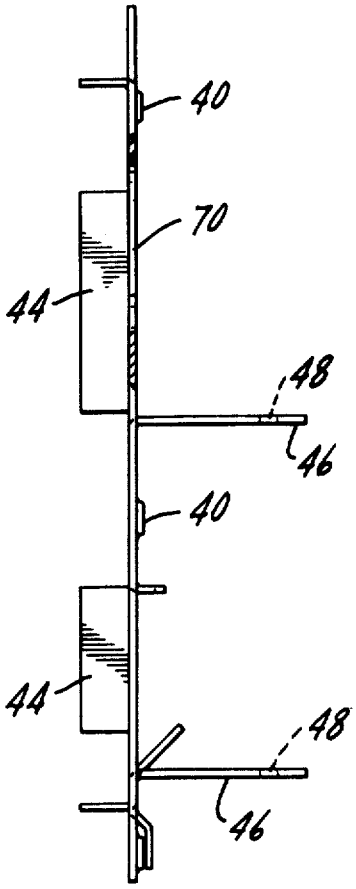
FIGURE 4 is a side view of the mounting plate illustrated in FIGURE 3.

On the inside of the wall surface 30 is a mounting plate 38 illustrated in detail in FIGURES 3 and 4. The mounting plate 38 may have threaded bosses 40 which are used to receive screws or the like 42 for attaching the base member. Note that the screws 42 extend through the inner plate 28, through the wall surface, and then into the threaded bosses 40. Of importance, is the fact the the screws 42, as illustrated in FIGURE 2, are substantially longer than necessary. Screws of this length are provided to accommodate differing wall thicknesses. The mounting plate 38 may have a plurality of generally outwardly extending projections 44, illustrated particularly in FIGURE 4, which extend toward the base member 10 or through the wall surface 30. As shown in the drawings, the projections 44 are generally the same thickness as the wall. Obviously this is not necessary and there may be differing wall thicknesses in which case the projections 44 either may or may not extend the full depth or thickness of the wall. In addition to the projections 44, the mounting plate 38 has a pair of spaced projections 46 which extend inwardly or away from the wall surface. The projections 46 may be used to attach the mounting plate 38 to a cross beam, for example, a two-by-four, behind the wall surface 30. Note the holes 48 for use in attachment.

A mixing valve is indicated at 50 and may have hot and cold water inlets, one of which is indicated at 52.

Extending downwardly from the mixing valve 50 is a conduit 54, which passes through an opening 74 in the mounting plate 38 and into the base member to the spout. Extending upwardly from the valve 50 is a further conduit 56, which may run to a shower fixture, as is conventional with showers and tub combinations. The mixing valve 50 may have a cylindrical portion 58 which extends through an opening 70 in the mounting plate 38, through the wall surface, through an opening 60 in the inner plate 28 and outwardly for attachment of a handle 62. The mixing valve used may be of the type shown in U.S. Re. Patent 25,920, although this is not necessary and many various types of mixing valves may be used herein.

There may be a sleeve 64, which encloses the cylindrical portion 58 of the mixing valve, with the sleeve passing through an opening 66 in the outer decorative plate 32. The sleeve provides a decorative outer covering and because it extends through opening 66 accommodates differing wall thicknesses. When the valve is of the type shown in U.S. Re. Patent 25,920, the handle 62 may be used for controlling both volume and temperature of the water discharge, with rotation of the valve handle 62 controlling temperature and reciprocation of the handle controlling volume of the water discharged. The mixing valve 50 may be attached to the mounting plate 38 by means of screws or the like 68 which extend through the valve housing and into openings 72 or the mounting plate 38.

The conduit 54 passes inwardly into the base member 10 between the walls 16 and 18 and terminates, as at 76. Extending along the outside of the conduit 54, and inwardly beyond the termination end 76, is a sleeve 78 having a seal 80 for sealing the interior surface of the sleeve 78 and the exterior surface of the conduit 54. The sleeve 78 is attached to a spout and diverter member indicated generally at 82. The details of the diverter are not shown herein, and various diverter members may be used. In particular, we may use the diverter structure shown in a copending application Ser. No. 617,137, filed Feb. 20, 1967, in the name of Paul A. Mongerson. The diverter may be operated by a knob 84 which is positioned outside of the base member and on a stem 86 which passes into the diverter 82. Below the diverter 82 there may be a spout 88, which may include an aerator. This is not essential and aerators are not used in every application. In any event, the passage of water from the conduit 54, through the spout 88, may be controlled by the diverter 82 through its control handle 84.

There is an opening 90 near the junction of the inner plate 28, and the top surface 18 of the base member, which functions as a drain. There is an additional base member opening 92 near the inner end of the bottom 16 which also functions as a drain.

Figure 6:
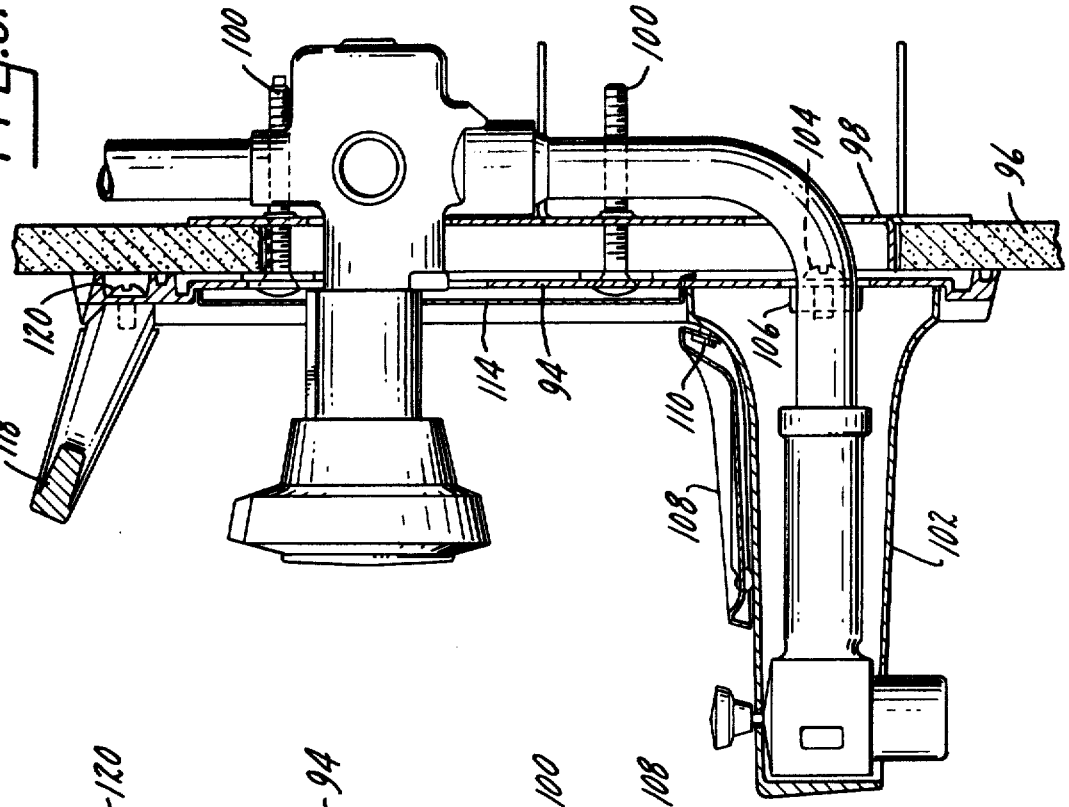
FIGURE 6 is a section along plane 6—6 of FIGURE 5.
Figure 5:
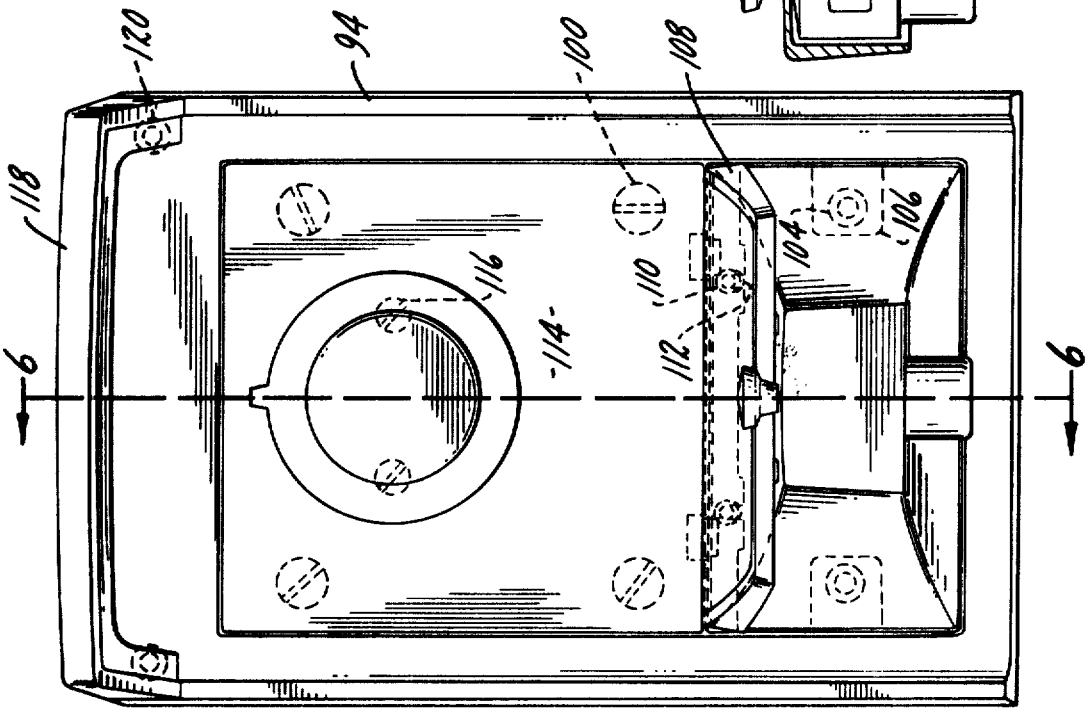
FIGURE 5 is a front plan view of a modified form of the invention.

FIGURES 5 and 6 show a modified form of the invention in which the spout, soap dish and grab bar may be independently attached to the inner plate. An inner plate *or base member* 94 may be positioned on one side of a wall surface 96 with the mounting plate 98, similar to the plate 38, being positioned on the other side of the wall 96. Screws or the like 100 may be used to hold the two plates together. A spout housing 102 may be attached to the mounting plate 94 by screws or the like 104 which are threaded into bosses 106. The spout housing 102 may be similar in size and shape to the spout housing indicated in the structure shown in FIGURES 1–4. In like manner, the diverter and the conduit carrying water to the diverter and spout structure may be the same as that shown in FIGURES 1–4.

A soap dish or soap platform 108 may be removably positioned on top of the spout housing 102. There may be small fasteners 110 extending outwardly from the spout housing 102 and designed to fit in grooves or the like 112 in the soap dish 108 for use in attaching the soap dish.

An outer decorative plate 114 may be fastened to the inner plate 94 by means of screws or the like 116 indicated in dotted lines in FIGURE 5. A grab bar 118, similar in size and shape to the grab bar indicated in the structure shown in FIGURES 1–4, may be attached to an upper portion of the inner plate 94 by screws or the like 120.

In general, the structure shown in FIGURES 5 and 6 is substantially the same as the structure shown in FIGURES 1–4, except that the spout, soap dish and grab bar are not integrally formed with the inner plate, but instead are independently attached to it. The valve and the handle for operating it may be the same as shown in the structure of FIGURES 1–4, as may the mounting plate 98.

The use, operation and function of the invention are as follows:

The plumbing fixture disclosed herein combines a number of plumbing features normally used in conjunction with a tub and shower into a single unit. There is a grab bar and soap dish which may be built integrally into the decorative outer base member. Normally such elements are separate and apart from any functional plumbing structure. Built into the same equipment is a tub spout and the diverter for controlling the flow of water between the tub spout and the shower head positioned above. Also included in the same plumbing fixture is a mixing valve which includes an operating member extending outside of the decorative plate 32. Of importance is the mounting plate itself, as it provides not only a means for mounting the exterior base member, but it also provides a mounting for the mixing valve. The mounting plate also includes a means for attachment of the entire unit to a cross beam or the like.

Although the invention has been described as a combination of several elements, it should be understood that in some applications the grab bar or hand grip may not be included in the entire plumbing fixture, whereas in other applications the soap dish may not be included. In some configurations there may be no spout as the unit is designed solely for a shower installation. In this connection, the structure shown in FIGURES 5 and 6 provides an arrangement whereby there is a basic structure to which can be added a spout, soap holder and grab bar, as desired.

Of importance in the plumbing fixture disclosed herein is the mounting arrangement whereby the mounting plate 38 and the inner plate 28 sandwich the supporting wall 30 between them. Such a method of installation provides for increased strength in that the bathroom wall is carrying the entire load of the plumbing fixture. This is particularly useful in that the force applied to the grab bar by a person entering or leaving the tub may tend to pull the plumbing fixture away from the wall. The sandwich construction also provides easy "rough-in" for the installing plumber.

In addition to the increased strength provided for the installation by the bathroom wall, the rearwardly extending projections 46 may be attached to a two-by-four extending between two wall studs. Such a method of installation may provide an alternate mounting arrangement, as well as tying the plumbing fixture into the wall framing for additional strength.

It is highly advantageous to locate all of the various bath fixtures and accessories in a single unit, as it positions the grab bar in the most desirable location for getting in and out of the tub and shower. Also, the soap dish is located away from the shower pattern, thus eliminating flooding of the soap dish. Positioning all such fixtures in a central location avoids individual projections around the tub area, thus providing greater safety for the user. In addition, because the various plumbing fixtures have been centrally located, there will be substantially reduced cost as far as initial installation is concerned.

The invention should not be limited to the precise construction of the base member shown herein, as there may be many variations, possibly decorative in nature, coming within the scope of the invention.

The various parts shown and described may be formed of metal as conventional, or of certain corrosion-resistant strong plastics. In many applications the exterior will be chrome-plated.

Whereas the preferred form of the invention has been shown and described herein, it should be realized that there are many modifications, substitutions and alterations thereto within the scope of the following claims.

We claim:

1. In a plumbing fixture, an external decorative base member, a mounting plate for attaching said base member to a wall surface, with said base member being attached to said mounting plate, a mixing valve having means for operating it, said operating means extending outwardly through said base member, and a handle outside of said base member, and attached to said operating means, a spout and a conduit between said spout and said mixing valve, said base member enclosing said spout and at least a portion of said conduit, diverter means at said spout, and means for operating said diverter means extending outside of said base member [.],

*a hand grip, spaced integral projections extending upwardly and outwardly from said base member, with said hand grip being mounted between said projections.*

[2. The structure of claim 1 further characterized by and including a hand grip, said base member including means for mounting said hand grip.]

[3. The structure of claim 2 further characterized in that the means for mounting said hand grip include spaced integral projections extending upwardly and outwardly, with said hand grip being mounted between said projections.]

4. The structure of claim 1 further characterized by and including means, integral with said base member, forming a plaftorm for holding soap.

5. The structure of claim 4 further characterized in that said soap platform is positioned at that portion of the base member enclosing the spout.

6. The structure of claim 5 further characterized in that said soap platform is formed by a plurality of spaced, generally parallel ribs, extending upwardly from that portion of the base member enclosing said spout.

7. The structure of claim 1 further characterized in that said diverter operating means extends upwardly through that portion of the base member enclosing said spout, and includes hand gripping means, outside of and above the base member.

8. The structure of claim 1 further characterized in that the handle attached to said valve operating means includes a generally annular dial member, located within the outline of said base member, but extending outwardly from the wall surface to which said base member is mounted.

9. The structure of claim 1 further characterized in that said mounting plate is positioned on the opposite side of said other wall surface from said base member, said mounting plate including projections, extending toward said base member, and screw means attaching said base member to said mounting plate.

10. The structure of claim 9 further characterized in that said mounting plate includes further projections, extending away from the base member, and for use in attaching the mounting plate to a support member.

11. The structure of claim 9 further characterized in that said mixing valve is attached to said mounting plate.

12. The structure of claim 1 further characterized in that said plumbing fixture includes a generally centrally arranged decorative plate, attached to said base member, said mixing valve operating means extending through said decorative plate, with the handle for operating said mixing valve being attached thereto, outside of said decorative plate.

13. In a plumbing fixture, an external decorative base member, a mounting plate for attaching said base member to a wall surface, with said base member being attached to said mounting plate, a mixing valve having means for operating it, said operating means extending outwardly through said base member, and a handle, outside of said base member, and attached to said operating means, a spout and a conduit between said spout and said mixing valve, said base member enclosing said spout and at least a portion of said conduit, a diverter member inside said spout, and means for operating said diverter member extending outside of said base member, a hand grip, said base member including spaced [portions for mounting said hand grip,] *sides, with portions of said sides extending upwardly and outwardly for forming a mounting for the hand grip, the lower portions of said sides extending outwardly and forming a portion of the covering for said spout and conduit,* said base member including means forming a platform for holding soap.

[14. The structure of claim 13 further characterized in that said base member includes a pair of spaced sides, with portions of said sides extending upwardly and outwardly for forming a mounting for the hand grip, the lower portions of said sides extending outwardly and forming a portion of the covering for said spout and conduit.]

15. In a plumbing fixture, an external base member, a mounting plate for attaching said base member to a wall surface, a mixing valve attached to said mounting plate, said mixing valve having means for operating it extending outwardly through said base member, and a handle attached to said mixing valve operating means, a spout and a conduit connecting said spout and said mixing valve, said mounting plate being on the opposite side of the wall surface from said base member, said mounting plate including projections extending toward said base member, said mounting plate further including projections extending away from said base member for use in attaching said mounting plate to a support beam.

16. The structure of claim 15 further characterized by and including screw members for use in attaching said base member to said mounting plate, with said screw members passing through the wall surface.

17. The structure of claim 15 further characterized in that said projections are integral with said mounting plate and are formed therefrom.

18. In a plumbing fixture, an external decorative base member, a mounting plate for attaching said base member to a wall surface, with said base member being attached to said mounting plate, said base member being on one side of a wall surface and said mounting plate being on the opposite side of the wall surface, a mixing valve having means for operating it, said operating means extending outwardly through said base member, and a handle outside of said base member, and attached to said operating means, a hand grip, said base member including means for mounting said hand grip, said base member including means forming a platform for holding soap.

19. In a plumbing fixture, an external decorative base member, means for mounting said base member to a wall surface, a mixing valve having means for operating it, said operating means extending outwardly through said base member, and a handle outside of said base member, and attached to said operating means, a hand grip, said base member including means for mounting said hand grip,

[and means forming a platform for holding soap.]

*a removable spout housing attached to said base member, and a removable soap platform attached to said spout housing.*

[20. The structure of claim 19 further characterized by and including a removable spout attached to said base member.]

[21. The structure of claim 20 further characterized in that the means forming a soap platform is removably attached to said spout.]

22. The structure of claim 19 further characterized in that said hand grip is removably attached to said base member.

References Cited

The following references, cited by the Examiner, are of record in the patented file of this patent or the original patent.

UNITED STATES PATENTS

| | | | |
|---|---|---|---|
| 1,414,792 | 5/1922 | Seither | 4—191 |
| 1,835,301 | 12/1931 | Hennessey | 4—191 |
| 2,460,005 | 1/1949 | Gruen | 4—191 |
| 3,012,251 | 12/1961 | Fife | 4—192 |
| 3,014,492 | 12/1961 | Young | 137—271 |
| 3,028,604 | 4/1962 | Warner | 4—185 |
| 3,443,266 | 5/1969 | Mongerson et al. | 4—191 |
| 3,493,977 | 2/1970 | Green | 4—191 |

FOREIGN PATENTS

| | | | |
|---|---|---|---|
| 463,780 | 3/1950 | Canada | 4—191 |
| 411,729 | 11/1966 | Switzerland | 4—192 |

SAMUEL B. ROTHBERG, Primary Examiner

D. B. MASSENBERG, Assistant Examiner